United States Patent
Chen et al.

(10) Patent No.: US 7,220,338 B2
(45) Date of Patent: May 22, 2007

(54) AQUEOUS HYBRID BONDING COMPOSITION AND PROCESS

(75) Inventors: Mai Chen, Hoffman Estates, IL (US); Jeffrey Harold Deitch, Crystal Lake, IL (US); Christine Margaret Zack, Crystal Lake, IL (US)

(73) Assignee: Rohm and Haas Company, Philadelphia, PA (US)

( * ) Notice: Subject to any disclaimer, the term of this patent is extended or adjusted under 35 U.S.C. 154(b) by 280 days.

(21) Appl. No.: 10/194,513

(22) Filed: Jul. 12, 2002

(65) Prior Publication Data

US 2003/0022979 A1 Jan. 30, 2003

Related U.S. Application Data

(60) Provisional application No. 60/306,932, filed on Jul. 20, 2001.

(51) Int. Cl.
*C09J 175/06* (2006.01)
*C09J 175/08* (2006.01)
*C09J 175/12* (2006.01)

(52) U.S. Cl. ............... 156/331.4; 156/331.7; 156/332; 524/507; 524/590; 524/839; 528/52

(58) Field of Classification Search ........... 156/331.4, 156/331.7, 332; 524/50–52, 507, 590, 839
See application file for complete search history.

(56) References Cited

U.S. PATENT DOCUMENTS

| | | | |
|---|---|---|---|
| 4,491,646 A | 1/1985 | Gruber et al. | |
| 4,609,690 A | 9/1986 | Gruber et al. | |
| 4,618,390 A | 10/1986 | Powell | |
| 4,731,416 A | 3/1988 | Saunders | |
| 5,336,711 A * | 8/1994 | Schneider et al. | 524/507 |
| 5,442,028 A * | 8/1995 | Fromwiller et al. | 528/44 |
| 5,455,293 A | 10/1995 | Wood et al. | |
| 5,470,907 A * | 11/1995 | Wallon et al. | 524/507 |
| 5,688,859 A * | 11/1997 | Schneider et al. | 524/591 |
| 5,854,338 A * | 12/1998 | Hovestadt et al. | 524/591 |
| 5,891,580 A * | 4/1999 | Fricke et al. | 428/424.8 |
| 6,013,725 A | 1/2000 | Dougherty | |
| 6,017,998 A * | 1/2000 | Duan et al. | 524/591 |
| 6,197,878 B1 | 3/2001 | Murray et al. | |

FOREIGN PATENT DOCUMENTS

| | | |
|---|---|---|
| EP | 0 454 413 | 10/1991 |
| EP | 0562282 A1 | 2/1993 |
| EP | 0 542 105 | 5/1993 |
| EP | 0 810 246 | 12/1997 |
| JP | 5320299 A | 12/1993 |
| JP | 6271827 A | 9/1994 |
| JP | 6329985 A | 11/1994 |
| JP | 7138527 A | 5/1995 |
| JP | 8041381 A | 2/1996 |
| JP | 8060063 A | 3/1996 |
| JP | 9077809 | 3/1997 |
| JP | 3068081 B1 | 7/2000 |
| WO | WO 01/04224 A1 | 1/2001 |

* cited by examiner

*Primary Examiner*—Sam Chuan Yao
(74) *Attorney, Agent, or Firm*—Stephen T. Falk

(57) ABSTRACT

A process for making an article contacted with a bonding agent that is prepared by providing an admixture including a latex and a polyol present in an amount of less than 20 wt. % of the admixture for providing hydroxyl functionality. The isocyanate is admixed with the latex/polyol admixture to form the bonding agent. A layer of the bonding agent is contacted with a substrate.

13 Claims, No Drawings

AQUEOUS HYBRID BONDING COMPOSITION AND PROCESS

CROSS REFERENCE TO RELATED PATENT APPLICATIONS

This is a non-provisional application of now abandoned, U.S. provisional application Ser. No. 60/306,932 filed Jul. 20, 2001.

The present invention relates to improved systems for bonding to a surface, and more particularly to an improved water-based bonding system employing a water-based acrylate/urethane hybrid composition for forming an interpenetrating polymer network (IPN). The invention is particularly suited for use as a laminating adhesive and is suitable, for example, for laminating flexible films and other substrates.

In recent years it has become desirable to expand the selection of commercially available bonding agents (including, for instance, adhesives and primers) to meet the ever-rising number of new technological applications. The desire to reduce volatile emissions and to improve ease of handling has driven the demand for improved water-based bonding agent systems. One such system that has been popular in widespread applications is a latex system; that is, a water-based dispersion or emulsion. Particularly attractive have been acrylic latex systems.

Water-based acrylic latex systems, for instance, have been widely employed for laminating adhesives. However, as compared with certain high performance water-dispersible urethanes or amine-epoxy systems, many water-based systems tend to have relatively low heat resistance, low adhesion, and low chemical and environmental resistance.

The modification of acrylic systems by the use of urethanes to form acrylic/urethane hybrid systems has been attempted in certain applications. For example, U.S. Pat. No. 6,197,878 describes a system for forming a relatively stiff polymer foam. Latex polymers are polymerized in a continuous liquid phase wherein a diol component is 60 to 100% by weight of the continuous phase. In view of the high level of polyol, the reaction of the latex and isocyanate is exothermic to a degree that a relatively stiff polymer is formed, rendering it useful in only limited applications.

U.S. Pat. No. 6,013,725 discloses a crosslinkable latex formed by in-situ generation of isocyanate and amine functionalities. The system therein requires the use of a specific monomer with amide functionality for emulsion polymerization of the latex.

JP 09077809 and JP 05320299 address reacting isocyanate monomer with an acrylic monomer having an OH group to prepare an acrylic urethane oligomer, which is then polymerized in water to form urethane acrylics.

JP 08060063 and JP 06329985 teach making polyurethane dispersion (PUD), and then mixing PUD with aqueous latexes to form a urethane/acrylic hybrid.

U.S. Pat. Nos. 4,491,646 and 4,609,690 and EP 562282, JP 3068081 are directed to aqueous hydroxyl functional acrylic latexes, which are crosslinked with water dispersible isocyanate. The hydroxyl functional group in the latex is provided from hydroxyl-containing acrylic monomers.

It is therefore desirable to provide a water-based bonding agent system of compositions and processes having improved performance characteristics, and preferably exhibiting performance characteristics of systems that are largely composed of urethanes or amine-epoxy systems. It is also desirable to provide an improved water-based bonding agent system that exhibits relatively long pot life, relatively good adhesion performance over a broad range of temperatures (e.g., −10° C. to +120° C.), and relatively good drop shear strength. It is also desirable that the bonding agent system be relatively low cost, not require the need to form a PUD to prepare a hybrid, be substantially devoid of excess functional groups or special latexes with functional groups for crosslinking, be easy to make and use, and be curable or otherwise hardenable for functional compatibility with the layers of material to which it is bonded.

The present invention meets the above needs by providing an improved water-based bonding agent system of compositions and processes, and particularly a hybrid of a urethane and a latex or water-based dispersion of particles of a polymer comprising at least one ethylenically unsaturated monomer. The latex is provided with a polyol dispersed in it. Prior to contacting a surface (such as when applied on a laminating machine), a water dispersible isocyanate is mixed with the latex to form a hybrid system (e.g., an acrylate/urethane hybrid system). The polyol in the latex preferably cures with the isocyanate to form at least one interpenetrating polymer network of urethane and the polymer, which polymer comprises at least one ethylenically unsaturated monomer. Thus, one preferred bonding agent of the present invention, prior to application, includes at least two components, namely a first component that includes a polyol and a latex including a polymer of at least one ethylenically unsaturated monomer, and a second component that includes a polyisocyanate.

The resulting bonding agent exhibits excellent heat, chemical and environment resistances, a drop shear indicative of high shear strength, adhesion over a wide range of temperatures (e.g., preferably from at least −10° C. to +120° C.) and humidities. The bonding agent preferably has a useful pot life after mixing of more than 8 hours, and is easy to handle and apply. The bonding agent is contacted with a first substrate and a second substrate is also contracted with the bonding agent to form a laminate.

As used herein, "bonding agent" is an agent that is suitable for joining itself to at least a first material, and preferably also to a second material. The first and second materials may be the same or different. "Bonding agent" encompasses an adhesive, a primer, or any other suitable coating for bonding to a surface. As used herein the terminology "(meth)acrylate monomer" refers collectively to acrylate monomers and methacrylate monomers. "Latex" or "latex composition" refers to a dispersion of a water-insoluble polymer which may be prepared by conventional polymerization techniques such as, for example, by emulsion polymerization.

Turning now in more detail to the invention, the latex useful in the present invention preferably is a water-based dispersion of particles of a polymer of at least one ethylenically unsaturated monomer, and more preferably at least one α, β-ethylenically unsaturated monomer. More preferably, the latex includes particles based upon acrylates or methacrylates. Suitable alkyl (meth)acrylate monomers include, for example, ethyl acrylate, butyl acrylate, 2-ethylhexyl acrylate, lauryl acrylate, methyl methacrylate, ethyl methacrylate, butyl methacrylate, isodecyl methacrylate, lauryl methacrylate, hydroxyethyl acrylate, sulfoethylmethacrylate, phosphoethylmethacrylate or mixtures thereof. Other suitable monomers or polymers might include, for example, vinyls (e.g., acetates, such as vinyl acetate, ethylene vinyl acetate; alcohols; chlorides such as polyvinyldichloride, polyvinyl chloride; or the like). Suitable acids, for example, acrylic acid, methacrylic acid or mixtures thereof may also be employed for preparing the polymer of the latex. While other functional groups might be employed in the monomers for the purpose of forming a latex (e.g., an amide), the present invention advantageously permits for the use of substantially pure ethylenically unsaturated monomers or monomers that consist essentially of the ethylenically unsaturated monomer. One or more suitable acrylontiriles or methacrylonitriles might also be employed. Commercially available conventional acrylic latex compositions may be employed as well. The latex will typically exhibit a viscosity ranging from about 10 to 1000 cps and more preferably from 20 to 500 cps. The solids content in the latex may range from 5 to 95%. More preferably it ranges from 20 to 80%, still more preferably from 30 to 70%, and even still more preferably it ranges from 40 to 60%. In one embodiment, the polymer of the latex has a weight average molecular weight of between 5000 and 2,000,000 and more preferably between 1,000,000 and 2,000,000.

The latex is mixed with an agent for providing hydroxyl functionality. Preferably, the agent is a suitable polyol, and may be a polyether polyol, a polyester polyol, polyester polyether polyol or a mixture thereof. A preferred polyol will have multiple hydroxyl functionality and thus will contain at least two hydroxyl groups. Preferred polyols are selected from diols, triols or mixtures thereof. The polyol is sufficiently nonvolatile that it will be fully or at least partially available for reaction with the isocyanate during mixing operations. The polyol also is water soluble or water dispersible. Preferably the polyol will have a number average molecular weight from 100 to 7500, more preferably 150 to 5000, and still more preferably from 200 to 1000. In one embodiment, the molecular weight is less than 1500 and still more preferably less than 600. An example of a highly preferred polyol is polypropylene glycol, such as 400 MW polypropylene glycol. The polyol is provided in an amount of less than 50 wt. %, more preferably less than 30 wt. %, still more preferably less than 20 wt. %, even still more preferably from 0.1 to 20 wt. %, and most preferably from 1 to 6 wt. % of the latex/polyol admixture.

It will be appreciated that surfactants may be employed as desired in the bonding agent composition of the present invention (e.g., for use in emulsion or dispersion polymerization) to provide stability, as well as to control particle size. Conventional surfactants include anionic or nonionic emulsifiers or their combination. Typical anionic emulsifiers include, but are not limited to alkali or ammonium alkyl sulfates, alkali or ammonium alkylether sulfates, alkali or ammonium alkylarylether sulfates, alkyl sulfonates, salts of fatty acids, esters of sulfosuccinic acid salts, alkyl diphenylether disulfonates, and salts or free acids of complex organic phosphate esters. Typical nonionic emulsifiers include, but are not limited to polyethers, e.g. ethylene oxide and propylene oxide condensates which include straight and branched chain alkyl and alkylaryl polyethylene glycol and polypropylene glycol ethers and thioethers, alkyl phenoxypoly(ethyleneoxy) ethanols having alkyl groups containing from about 7 to about 18 carbon atoms and having from about 4 to about 100 ethyleneoxy units, and polyoxyalkylene derivatives of hexitol, including sorbitans, sorbides, mannitans, and mannides. Surfactants may be employed in the polymer compositions of the present invention at levels of 0.1 to 3 wt. % or greater, based on the total weight of the final composition.

After mixing, the resulting polyol/latex admixture may be stored in a suitable receptacle or container for subsequent use, for instance at the site of polyol/latex mixing, bonding agent application or at a remote site. Thereafter, the polyol/latex admixture is mixed with a suitable isocyanate for achieving a reaction between the polyol and the isocyanate suitable for in situ formation of a urethane, which is thereby dispersed in the latex and ready for applying to a substrate. Preferably, upon curing, an interpenetrating polymer network will result.

The isocyanate employed may be any suitable isocyanate, but preferably it is an aliphatic isocyanate, an aromatic isocyanate or a mixture thereof. Preferably, the isocyanate also is water soluble or dispersible. Examples of suitable isocyanates include those based on toluene diisocyanate (TDI), isophorone diisocyanate (IPDI), hexamethylene diisocyanate (HDI), diphenyl methane diisocyanate (MDI), dicyclohexyl methane diisocyanate (HMDI), isomers thereof or mixtures thereof. Prepolymers of an isocyanate and a polyol may also be employed.

The relative proportions of polyol to isocyanate may vary as desired, though a preferred molar ratio of NCO/OH will be 0.9 to 3.0, and more preferably 1. Typically, an excess of isocyanate will be employed, e.g., at NCO/OH molar ratio ranging up to 3 parts isocyanate to 1 part polyol, and more preferably 2 parts isocyanate to 1 part polyol. In one preferred overall mixture including polyol, isocyanate and latex, the isocyanate is provided in an amount up to 0.01 to 0.8 (and more preferably 0.1 to 0.3) parts isocyanate to 1 part solids in the latex, with the polyol present in the above preferred proportions relative to isocyanate. The pH of the resulting overall mixture preferably is 5 to 9 and more preferably is 6 to 8.

Other optional components of the compositions of the present invention include, but are not limited to, agents selected from co-solvents, coalescing agents, pigments or other colorants, fillers, reinforcement (e.g., fibers), dispersants, wetting agents, waxes, catalysts, blowing agents, antifoam agent, UV absorbers, flame retardants, adhesion promoters, antioxidants, biocides, coalescing agents, or stabilizers. These optional components (as desired) may be added in any order of addition that does not cause an incompatibility between components. Components that do not dissolve in the aqueous carrier (such as pigments and fillers) can be dispersed in the latex or an aqueous carrier or co-solvent using a mixer (optionally a high shear mixer). The pH of the composition can be adjusted by adding acid or base, with agitation. Examples of base include, but are not limited to ammonia, diethylamine, triethylamine, dimethylethanolamine, triethanolamine, sodium hydroxide, potassium hydroxide, and sodium acetate. Examples of acids include, but are not limited to, acetic acid, formic acid, hydrochloric acid, nitric acid, and toluene sulfonic acid.

As gathered from the foregoing, the system of the present invention contemplates the employment of two components, which preferably are mixed using a suitable mixer (e.g., an electrically, pneumatically, or an otherwise powered mechanical mixer) prior to or during application to a substrate to form the bonding agent. Thus, the latex/polyol admixture typically will be packaged separately from the isocyanate. Mixing may take place at any suitable time in the process, such as before, during, or as a result of the application process. All of the present steps may be carried out under ambient room temperature conditions. As desired, heating or cooling may be employed.

The bonding agent of the present invention is useful for bonding substrates together. The substrates may be similar material or dissimilar material. Though wet lamination processes are possible, preferably the bonding agent is particularly useful for dry bond lamination of a plurality of substrate layers. In a preferred embodiment, a layer of the bonding agent is applied to a first substrate layer, water is removed (e.g., with heated air or otherwise), and the resulting dried bonding agent layer is covered with a second substrate layer to form a laminated article wherein the two substrates are bonded together by the dried layer of bonding agent. In a preferred embodiment, the substrate layers are provided in the form of rolls of substrate material. The sheets may be on the order of 1 to 10 mils in thickness. Larger thicknesses are also possible, as are smaller thicknesses (e.g., on the order of 1 or more microns).

The compositions of the present invention can be applied to desired substrates using conventional application techniques such as rotogravure printing, flexographic printing, conventional or airless spray, roll coating, brush coating, wire wound rod coating, knife coating, or coating processes such as curtain-, flood-, bell-, disc-, and dip-coating processes. Coating with the bonding agent may be done over an entire surface or only a portion of it, such as along an edge, or at intermittent locations. Once applied to the substrate, the compositions are dried, such as by application of heat and air flow, or some other suitable approach for removing substantially all remaining water.

The present invention benefits from advantageously long pot lives of the bonding agent. Thus, after the components of the bonding agent are mixed, it is contemplated that several hours may be permitted to elapse before application to a substrate. For example, in one embodiment the useful life is at least 8 (and more preferably at least 12 to 24) hours and thus at least eight hours may elapse before application to a substrate.

The bonding agent compositions may find other suitable application as top coats, or other intermediate coats, thus rendering them potentially usefull in paints, inks, plastics, or the like. The bonding agent compositions of the present invention can be used on a wide variety of one or a plurality of suitable substrates such as high, low or medium density plastics (for example, of a type selected from polystyrene, polyethylene, ABS, polyurethane, polyethylene terephthalate, polybutylene terephthalate, polypropylene, polyphenylene, polycarbonate, polyacrylate, polyvinyl chloride, polysulfone or mixtures thereof), paper, wood and reconstituted wood products, polymer coated-substrates, wax coated paperboard, cardboard, particle board, textiles, leather, and metal (aluminum, ferrous as well as other non-ferrous), metallized plastics (e.g., metallized plastic film) or the like. The bonding agent is particularly attractive for packaging and sealing applications. For example, in one aspect, a plastic film, metal film, or metallized plastic film is laminated (e.g., over all or at least a portion of its surface, such as along its edges, or at intermittent locations) with the bonding agent of the present invention. In one such application, food may be packaged for boil-in-bag preparation, or the resulting laminate might be used for sealing or packaging some other article.

Laminated articles resulting from the present invention exhibit significant improvement of the heat resistance, adhesion and drop shear over conventional latexes without urethane. Drop shear durations (as tested by the protocol described in the Examples herein) are at least 150 hours, more preferably at least 300 hours, even more preferably at least 1000 hours and still more preferably at least 2000 hours. One inch (2.54 cm) strip samples of laminate articles preferably exhibit T-peel adhesion measurements and boil-in-bag measurements of at least 300 g/in (118 g/cm), 450 g/in (177 g/cm), and more preferably at least 600 g/in (236 g/cm). Preferably, the adhesive strength exceeds the strength of the substrate (i.e., the substrate fails before the bonding agent).

It will be appreciated that the above steps are preferred, but that the sequences described and combination of ingredients may be altered and still remain within the scope of the present invention. The following examples are presented to illustrate further various aspects of the present invention, but are not intended to limit the scope of the invention in any aspect.

EXAMPLES

Example 1

A water-based latex is made from a mixture of butyl acrylate, acrylic acid, and methacrylic acid (BA/AA/MAA). It has solids of 40% and pH of about 7.

Example 2

An amount of 100 grams of the material from Example 1 is mixed with 2 grams of polyprolylene glycol (Mw 400).

Example 3

Four grams of water-dispersable polyisocyanate based on hexamethylene diisocyanate (%NCO=17) is dispersed into 100 grams of the material of Example 2 with an electric mixer for 15 minutes.

Example 4

An amount of 100 grams of the material of Example 1 is mixed with 4 grams of polypropylene glycol (Mw 400).

Example 5

An amount of 7.3 grams of water-dispersible polyisocyanate based on hexamethylene diisocyanate (%NCO=17) is dispersed into 100 grams of the material of Example 4 and is mixed with an electric mixer for 15 minutes.

Drop shear tests were performed using laminates made on 2 mil PET/PET with the adhesives. A two lb/ream coating weight was applied and the samples were cured for a week before the drop shear test. The samples were suspended with a 1,000 g weight attached on one side of the laminate. Testing was deemed completed when the sample weights fell, so that the longer time that was observed corresponded with stronger shear strength.

Adhesion tests were performed by preparing one inch (2.54 cm) strips, cut from the laminate. T-peel adhesion was measured by instrument using conventional techniques and in accordance with ASTM D1876.

The laminates for adhesion and performance tests were made by coating the adhesive on a first substrate at 1.5 pounds (0.7 kg)/ream, drying the water by hot air, and laminating a second substrate to the first coated substrates.

Boil-in-bag tests were performed by preparing a pouch from the laminate and filling it with vinegar, corn oil and ketchup at 1:1:1 mix ratio by weight. This pouch was then heated in boiling water for 60 minutes.

The following results were obtained.

| | Base latex | Polyols | Water-dispersable isocyanate | Drop shear test (hours) | Adhesion on PET/MDPE before "boil-in-bag" test (g/in) | Adhesion on PET/MDPE after "boil-in-bag" test (g/in) |
|---|---|---|---|---|---|---|
| Example 1 | 40% solids | 0% | 0% | 55.2 | 430 | 0 |
| Example 2 | 40% solids | 2% | 0% | 25.6 | 450 | 0 |
| Example 3 | 40% solids | 2% | 4% | >2,000 | 650, film failure | 340, film failure |
| Example 4 | 40% solids | 4% | 0% | 8.7 | 400 | 0 |
| Example 5 | 40% solids | 4% | 7.3% | >2,000 | 750, film failure | 550, film failure |

The laminates made with the acrylic/urethane hybrid composition passed the "boil-in-bag" test and exhibited substantially higher drop shear than acrylic adhesive by itself. Film failure confirms that the substrate fails before the bonding agent. The data above indicates that the present invention is useful for providing an improved bonding agent for laminate articles.

What is claimed is:

1. A two-component bonding agent composition, comprising:
    a first component including a latex admixture including 0.1 to 20 wt. % of a polyol containing at least two hydroxyl groups and being selected from the group consisting of polyether polyols, polyester polyols, polyether polyester polyols and mixtures thereof, and 80 to 99.9 wt. % of a water-based polymer formed of ethylenically unsaturated monomers wherein said polymer is formed from monomers without hydroxyl functionality; and
    a second component including a water dispersible polyisocyanate, said second component being present relative to said first component at a NCO/OH molar ratio of 0.9 to 3.0.

2. The composition of claim 1 wherein said polyol is polypropylyene glycol.

3. The composition of claim 1 wherein said polymer are formed of α, β-ethylenically unsaturated monomer and have a weight average molecular weight between 5000 and 2,000,000.

4. The composition of claim 2 wherein said polyol has a molecular weight between about 200 and about 1,000.

5. The composition of claim 1 wherein said water dispersible isocyanate is selected from isocyanates based on toluene diisocyanate, isophorone diisocyanate, hexamethylene diisocyanate, diphenyl methane diisocyanate, dicyclohexyl methane diisocyanate, isomers thereof or mixtures thereof.

6. The composition of claim 1, wherein said bonding agent exhibits a pot life of at least 8 hours after said first component and said second component are blended together.

7. A laminate comprising a first and a second sheet of film adhered by said composition of claim 1.

8. A process for making a laminated article wherein at least two substrate layers are bonded together by a layer of a bonding agent, comprising bonding said at least two substrate layers with the bonding agent composition of claim 1.

9. A process for making a laminated article wherein at least two substrate layers are bonded together by a dried layer of a bonding agent, comprising the steps of:
    (a) providing the two-component bonding agent of claim 1;
    (b) admixing said first component and said second component;
    (c) applying a wet layer of said bonding agent to a first substrate layer;
    (d) drying said bonding agent; and
    (e) covering said dried layer of bonding agent with a second substrate layer to form said laminated article.

10. The process of claim 9, wherein said first substrate layer is a film and wherein said second substrate layer is a film.

11. The composition of claim 1 wherein said monomers are selected from the group consisting of alkyl acrylates, alkyl methacrylates, vinyl monomers, acrylic acid, methacrylic acid, acrylonitnles, and methacrylonitriles, or mixtures thereof.

12. The composition of claim 1 wherein said monomers are selected from the group consisting of ethyl acrylate, butyl acrylate, 2-ethylhexyl acrylate, lauryl acrylate, methyl methacrylate, ethyl methacrylate, butyl methacrylate, isodecyl methacrylate, lauryl methacrylate, sulfoethylmethacrylate, phosphoerhylmethacrylate, acrylic acid, methacrylic acid, or mixtures thereof.

13. A two-component bonding agent composition, comprising:
    a first component including a latex admixture including 0.1 to 20 wt % of a polyol containing at least two hydroxyl groups and being selected from the group consisting of polyether polyols, polyester polyols, polyether polyester polyols and mixtures thereof, and 80 to 99.9 wt. % of a water-based polymer formed of ethylenically unsaturated monomers wherein said monomers are selected from the group consisting of ethyl acrylate, butyl acrylate, 2-ethyihexyl acrylate, lauryl acrylate, methyl methacrylate, ethyl methacrylate, butyl methacrylate, isodecyl methacrylate, lauryl methacrylate, sulfoethylmethacrylate, phosphoethylmethacrylate, acrylic acid, methacrylic acid, or mixtures thereof; and
    a second component including a water dispersible polyisocyanate, said second component being present relative to said first component at a NCO/OH molar ratio of 0.9 to 3.0.

* * * * *